(12) United States Patent
Cheramie

(10) Patent No.: US 6,922,922 B2
(45) Date of Patent: Aug. 2, 2005

(54) AMPHIBIOUS DREDGING VEHICLE AND METHOD FOR RESTORING WETLANDS USING SAME

(76) Inventor: Rickey Cheramie, P.O. Box 141, Golden Meadow, LA (US) 70357

( * ) Notice: Subject to any disclaimer, the term of this patent is extended or adjusted under 35 U.S.C. 154(b) by 0 days.

(21) Appl. No.: 10/695,640

(22) Filed: Oct. 28, 2003

(65) Prior Publication Data

US 2004/0255494 A1 Dec. 23, 2004

Related U.S. Application Data

(63) Continuation-in-part of application No. 10/349,599, filed on Jan. 23, 2003, now Pat. No. 6,827,525.

(51) Int. Cl.[7] .......................... E02B 15/04; E02D 17/16; E02F 1/00; E02F 3/00
(52) U.S. Cl. ............................. 37/307; 405/63; 405/70; 405/74; 405/210
(58) Field of Search .............................. 405/60, 63, 70, 405/71, 73, 74, 222, 223, 210; 37/307–309, 312, 317–333, 342–344

(56) References Cited

U.S. PATENT DOCUMENTS

| | | | |
|---|---|---|---|
| 3,418,961 A | | 12/1968 | Gregg |
| 3,842,785 A | | 10/1974 | Rivet |
| 3,951,093 A | | 4/1976 | Poche |
| 3,998,060 A | * | 12/1976 | Preus ........................... 405/70 |
| 4,052,801 A | | 10/1977 | Smith |
| 4,312,762 A | | 1/1982 | Blackburn et al. |
| 4,664,792 A | * | 5/1987 | Fors et al. ................... 210/170 |
| 5,102,261 A | * | 4/1992 | Gunderson, III ............. 405/70 |
| 5,346,329 A | * | 9/1994 | Goans et al. ................. 405/68 |
| 5,511,508 A | | 4/1996 | Wilson et al. |
| 5,893,978 A | * | 4/1999 | Yoda et al. .................. 210/747 |
| 5,901,475 A | | 5/1999 | Wilson et al. |
| 5,960,890 A | | 10/1999 | Crain |
| 5,984,032 A | | 11/1999 | Gremillion et al. |
| 6,119,375 A | | 9/2000 | Wilson et al. |
| 6,346,193 B1 | * | 2/2002 | Bauer .......................... 210/615 |
| 6,485,229 B1 | * | 11/2002 | Gunderson et al. ........... 405/63 |
| 6,567,341 B2 | * | 5/2003 | Dreyer et al. .................. 367/1 |

FOREIGN PATENT DOCUMENTS

WO    WO 02/098801 A1  *  12/2002  ............. C02F/3/00

* cited by examiner

Primary Examiner—Christopher J. Novosad
(74) Attorney, Agent, or Firm—Didriksen Law Firm; Ronald J. Ventola, II

(57) ABSTRACT

An amphibious dredging vehicle includes a base including a pair of floatable pontoons linked together in essentially parallel relation; a cutterhead dredge system that is mounted on the base and that includes a cutterhead mounted on the front end portion of the base, a first directable discharge mounted to the rear end portion of the base, and a dredge pump in operative connection with the cutterhead and the directable discharge so as to develop suction at the cutterhead and to propel material from the cutterhead to the directable discharge. The directable discharge is configured so that the operator can aim the directable discharge in order to use the dredge pump to propel the amphibious dredging vehicle through water. The amphibious dredging vehicle may be used as part of a system and may be used with a method for building up land in a water-covered or water-surrounded area.

26 Claims, 4 Drawing Sheets

AMPHIBIOUS DREDGING VEHICLE AND METHOD FOR RESTORING WETLANDS USING SAME

CROSS-REFERENCE TO RELATED APPLICATIONS

This application is a continuation-in-part of applicant's U.S. patent application Ser. No. 10/349,599, filed Jan. 23, 2003, now U.S. Pat. No. 6,827,525 B2.

STATEMENT REGARDING FEDERALLY SPONSORED RESEARCH OR DEVELOPMENT

Not applicable.

REFERENCE TO SEQUENCE LISTING, TABLE, OR COMPUTER PROGRAM LISTING SUBMITTED ON COMPACT DISK

Not applicable.

BACKGROUND OF THE INVENTION (1) Field of the Invention

The invention relates to amphibious vehicles, particularly to amphibious vehicles for use in dredging, and more particularly to restoring wetlands using amphibious dredging vehicles.

(2) Description of the Related Art

Amphibious vehicles, sometimes called marsh buggies, were first developed about fifty years ago. The early vehicles were often used to transport persons and equipment through marshes for oil-and-gas exploration.

First-generation amphibious vehicles have two engines powering four large hollow wheels. The wheels are made of lightweight steel to provide both buoyancy and durability. Each wheel has deep, lugged cleats for traction.

Second-generation amphibious vehicles incorporate pontoons and track-drive systems. These second-generation amphibious vehicles include two longitudinal pontoons for buoyancy and at least one continuous drive track surrounding each pontoon for drive power. Each drive track includes an endless chain driven by a hydraulic motor through a sprocket, and each chain carries channel-type cleats for traction. These conventional vehicles are common in the art of amphibious vehicles. For example, see U.S. Pat. No. 5,984,032 to Gremillion et al.

Both first-generation and second-generation amphibious vehicles move in shallow water by gripping the water bottom with their cleats and rolling or tracking forward. (In this patent application "shallow water" means water in which the cleats of a conventional amphibious vehicle can grip the water bottom; and "deeper water" means water in which the cleats of a conventional amphibious vehicle float above the water bottom and cannot grip it.) In deeper water, conventional amphibious vehicles move by paddling the water with their cleated wheels or cleated tracks. The wheels or tracks are driven just as they are on land or in shallow water, and the vehicle moves by the force created by moving the wheels or tracks through the water. These vehicles move through deeper water inefficiently and slowly.

Cutterhead dredges are useful for restoring degraded wetlands. In restoring wetlands, cutterhead dredges can be used to rebuild land in water-covered areas where erosion has occurred. Applicant's U.S. patent application Ser. No. 10/349,599, which is incorporated herein by reference, discloses a system and method for restoring degraded wetlands using a cutterhead dredge and other devices.

Cutterhead dredges intended for use in wetlands are commonly mounted either on a floating vessel—typically a boat or a barge—or on a conventional amphibious vehicle. Whether mounted on a floating vessel or on an amphibious vehicle, cutterhead dredges work well in the areas that they can reach. But both floating vessels and conventional amphibious vehicles cause problems when one dredging task is complete and the operator needs to move the dredge to a new location. Floating vessels cannot travel over land; conventional amphibious vehicles travel across water inefficiently and slowly.

Floating vessels are limited to areas where there is enough water to float the particular vessel—preferably without undue risk of running aground. Because wetlands restoration often takes place in a degraded marsh—a combination of land, water too shallow for most vessels, and deeper water—floating vessels simply cannot reach many areas that need to be restored. Further, in many wetlands that need to be restored, cutting a channel for a floating vessel would be expensive and counterproductive.

Unlike floating vessels, conventional amphibious vehicles can travel on land or in shallow water. But in deeper water, where their cleats cannot grip the bottom, conventional amphibious vehicles move so slowly that driving them a substantial distance across deeper water becomes impractical. The user must choose between driving the conventional amphibious vehicle slowly across the deeper water or finding another way—usually transport by vessel or truck—to move the vehicle where it needs to be. When a vessel or truck can be used to transport a conventional amphibious dredging vehicle, the transportation requires substantial additional equipment (and thus substantial additional cost) when compared to the applicant's amphibious dredging vehicle.

Further, many wetlands that need restoring simply cannot be reached conveniently by vessel or by truck. Accessing these areas forces the user of a conventional amphibious vehicle to endure the long, slow, unproductive trip to the dredging area from the closest point of access.

Applicant's invention improves on the prior art by using the pumping capacity of a cutterhead dredge to increase a conventional amphibious vehicle's speed and maneuverability in deeper water. The applicant's amphibious dredging vehicle provides greater speed and maneuverability in deeper water than a conventional amphibious vehicle provides. And using applicant's invention, a cutterhead dredge can be moved across land or shallow water as if mounted on a conventional amphibious vehicle. In sum, when compared to dredges mounted on conventional amphibious vehicles, applicants' amphibious dredging vehicle provides equal performance on land or in shallow water and superior performance in deeper water.

In a degraded marsh that includes land, shallow water, and deeper water that must all be crossed for the dredge to do its work, applicant's invention allows for faster, more efficient, and more convenient restoration than is possible using a dredge mounted on a floatable vessel or on a conventional amphibious vehicle.

Applicant's invention provides an amphibious dredging vehicle with improved mobility in deeper water. In embodiments of applicant's invention in which only a single directable discharge is present, the amphibious dredging vehicle has this advantage when the vehicle is being moved from one dredging area to a second dredging area—with no dredging performed during the trip from the first dredging area to the second. When a single-directable-discharge embodiment of the amphibious dredging vehicle is dredging (actually removing material), the directable discharge normally will be unavailable for propulsion. The directable discharge cannot normally be used for propulsion during material removal because normally the dredging plan will require the dredged material to be deposited in a particular area by means of piping connected to the dredge discharge. When piping is connected to the directable discharge of an amphibious dredging vehicle that has a single directable discharge, the directable discharge cannot provide propulsion to the amphibious dredging vehicle.

On the other hand, if the amphibious dredging vehicle is equipped with a second directable discharge that is not connected to the dredge cutterhead so as to discharge dredged material, then the second directable discharge may be used for propulsion while the cutterhead is being used to remove and deposit dredged material.

BRIEF SUMMARY OF THE INVENTION

It is an object of this invention to provide an amphibious dredging vessel that includes one or more of the following: a directable discharge connected to the dredge pump and controlled by a directable-discharge-control means for aiming the directable discharge; a water discharge connected to a water pump and controlled by a water-discharge-control means for aiming the water discharge.

It is an object of some embodiments of this invention to provide a method for restoring wetlands using the amphibious dredging vehicle disclosed herein and optionally using, along with the amphibious dredging vehicle, a system for building up land in a water-covered area as described in applicant's U.S. application Ser. No. 10/349,599, which is incorporated herein by reference.

The invention will be better understood in view of the following description presented with reference to the accompanying drawings:

Both the foregoing general description and the following detailed description are exemplary and explanatory only and do not restrict the invention as claimed.

DETAILED DESCRIPTION OF THE INVENTION

The inventor now moves to a detailed description of an embodiment of an amphibious dredging vehicle 100 according to the invention.

Figure 2:
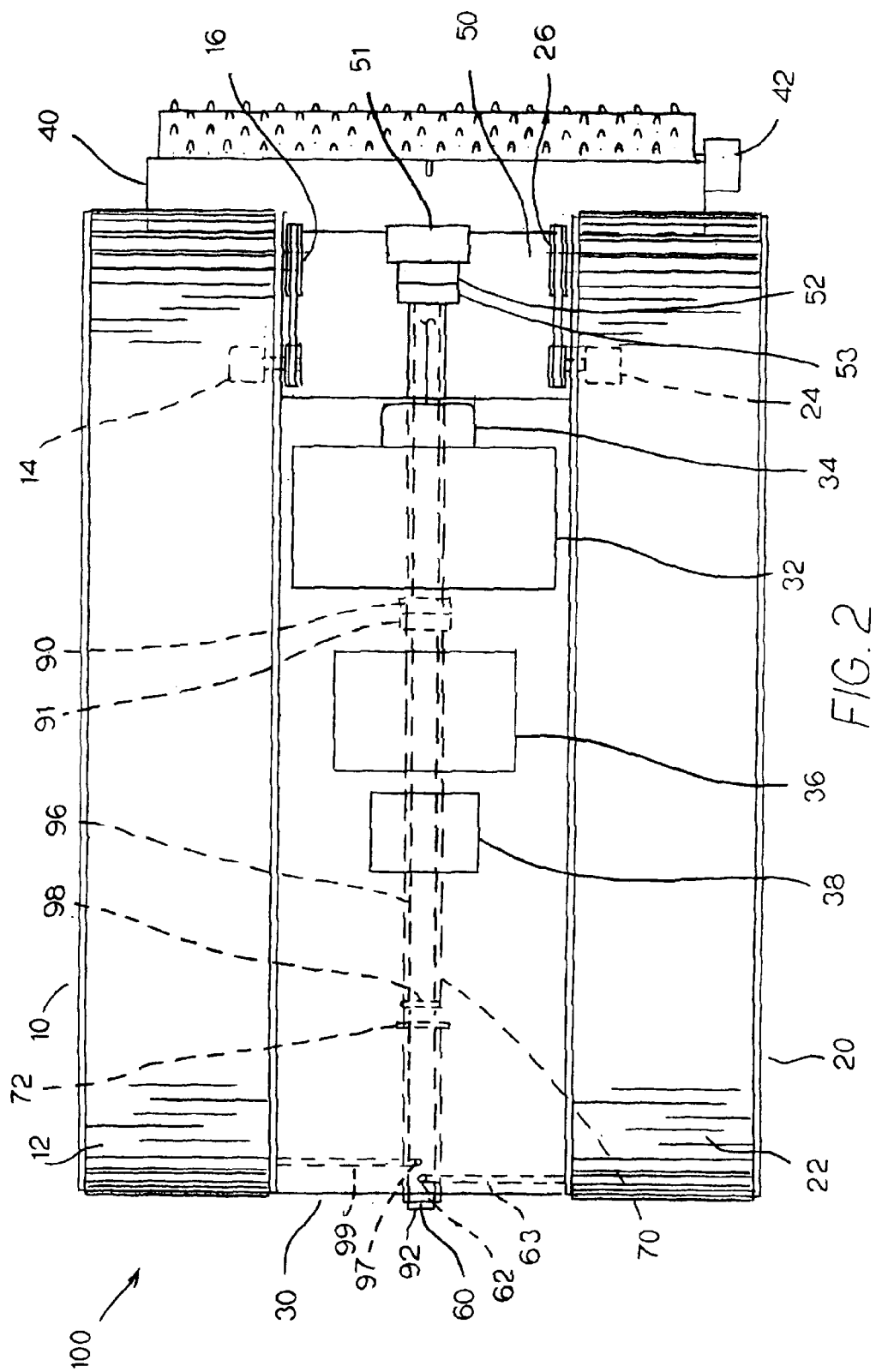
FIG. 2 is a partial top view of an amphibious dredging vehicle according to the invention.

As best seen in FIG. 2, amphibious dredging vehicle 100 has first floatable pontoon 10 and second floatable pontoon 20 with a link disposed therebetween and fixed thereto in conventional fashion, such as by welding or bolting the link to floatable pontoons 10 and 20. In this embodiment, floatable pontoons 10 and 20 are constructed of lightweight and sturdy metal and are equipped with conventional internal baffles, which increase the strength of the pontoons and render the pontoons less likely to lose their buoyancy due to a leak or puncture. The link between the floatable pontoons 10 and 20 may take any convenient and sufficiently sturdy form. In the embodiment depicted, the link takes the form of a conventional metal frame 31 having a generally flat deck 30 mounted thereon. The deck 30 allows for a convenient mounting point for other components of the invention and for other components of the amphibious dredging vehicle 100. The total width and length of the amphibious dredging vehicle 100 may preferably be selected to allow the amphibious dredging vehicle 100 to be transported by truck.

The front end portions of first floatable pontoon 10 and second floatable pontoon 20 are aligned with the front end portion of deck 30. First floatable pontoon 10 has conventional drive track 12 mounted thereon. Second floatable pontoon 20 has conventional drive track 22 mounted thereon. The pontoons may be constructed of any material that is sufficiently light and durable to allow construction of a sturdy and floatable pontoon; examples include aluminum and steel.

Mounted to the front end portion of the deck 30 is cutterhead 40. Cutterhead 40 may be of any convenient design, including cylindrical or disk-shaped rotating devices or arrays of high-pressure water jets; a cylindrical rotating design is shown here. Also mounted to the deck 30 is dredge pump 50, which is operatively connected to cutterhead 40 in conventional fashion. Dredge pump 50 includes both impeller housing 51 and ten-inch hydraulic pump 52.

Figure 4:
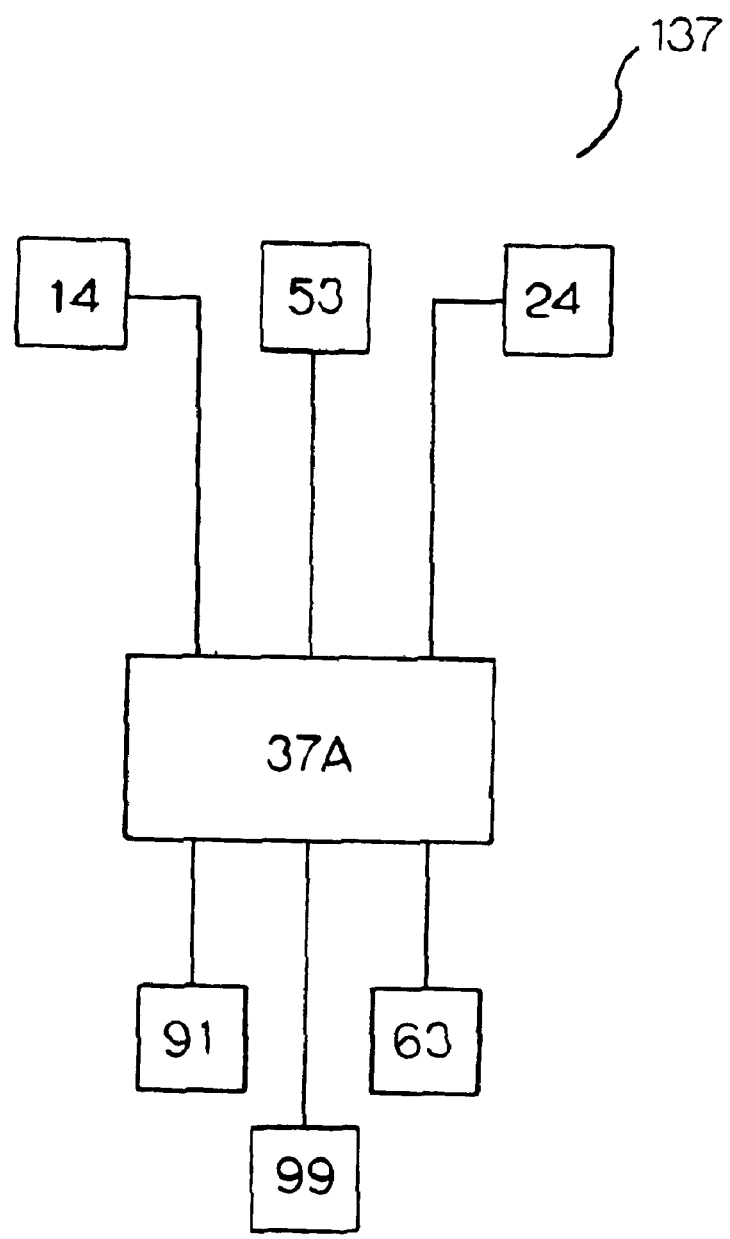
FIG. 4 is a schematic diagram showing a hydraulic circuit according to the invention.

Also mounted near the front end portion of deck 30 is control house 32. Control house 32 provides a convenient location for operating the amphibious dredging vehicle. Tank housing 38 includes therein tanks for both diesel fuel and hydraulic fluid. A powerplant in the form of diesel engine 36 provides power to the amphibious dredging vehicle 100 through three separate paths. The powerplant also may take the form of other fuel-air engines, electric motors, or other power-providing mechanisms. Diesel engine 36 powers pump 37A that pressurizes hydraulic fluid in a conventional hydraulic circuit 137, which includes conventional tubing linking the hydraulic pump 37A to all devices that are powered by the hydraulic circuit 137. FIG. 4 is a schematic diagram showing that the hydraulic circuit 137 links hydraulic pump 37A to first hydraulic drive motor 14, second hydraulic drive motor 24, hydraulic drive motor 53 mounted adjacent to dredge pump 50, hydraulic drive motor 91 mounted adjacent to water pump 90, hydraulic ram 63, and hydraulic ram 99; the devices are linked in conventional fashion by pairs of hydraulic lines.

In one path, the hydraulic circuit 137 powers the drive tracks, which allow the amphibious dredging vehicle to track forward across land or shallow water. The hydraulic circuit 137 powers a first track-driving means in the form of a first hydraulic drive motor 14 and second track-driving means in the form of second hydraulic drive motor 24. The first hydraulic drive motor 14 drives first drive track 12 through a chain and sprocket 16. The second hydraulic drive motor 24 likewise drives second hydraulic drive motor 24 drives second drive track 22 through a chain and sprocket 26. The claimed first track-driving means and the claimed second track-driving means do not have to be hydraulic drive motors. Instead, the claimed first track-driving means and the claimed second track-driving means may take the form of any device capable of providing sufficient motive power, including electric motors and mechanical transmissions driven either by a central powerplant or by individual powerplants for each track.

In the second path, the hydraulic circuit 137 provides power to a dredge-pump-driving means in the form of hydraulic drive motor 53 that drives dredge pump 50. When the dredge is being moved across deeper water from one dredging site to another, dredge pump 50 may be used to pump water through directable discharge 60 to move the amphibious dredging vehicle 100. By controlling the aim or orientation of directable discharge 60, the operator may control the direction of the amphibious dredging 100 vehicle when the dredge pump 50 is being used to move the amphibious dredging vehicle 100 through water. The claimed dredge-pump-driving means does not have to be a hydraulic drive motor. Instead, the claimed dredge-pump-driving means may take the form of any device capable of providing sufficient motive power, including electric motors and mechanical transmissions driven either by a central powerplant or a powerplant dedicated to driving the dredge pump 50.

Figure 3:
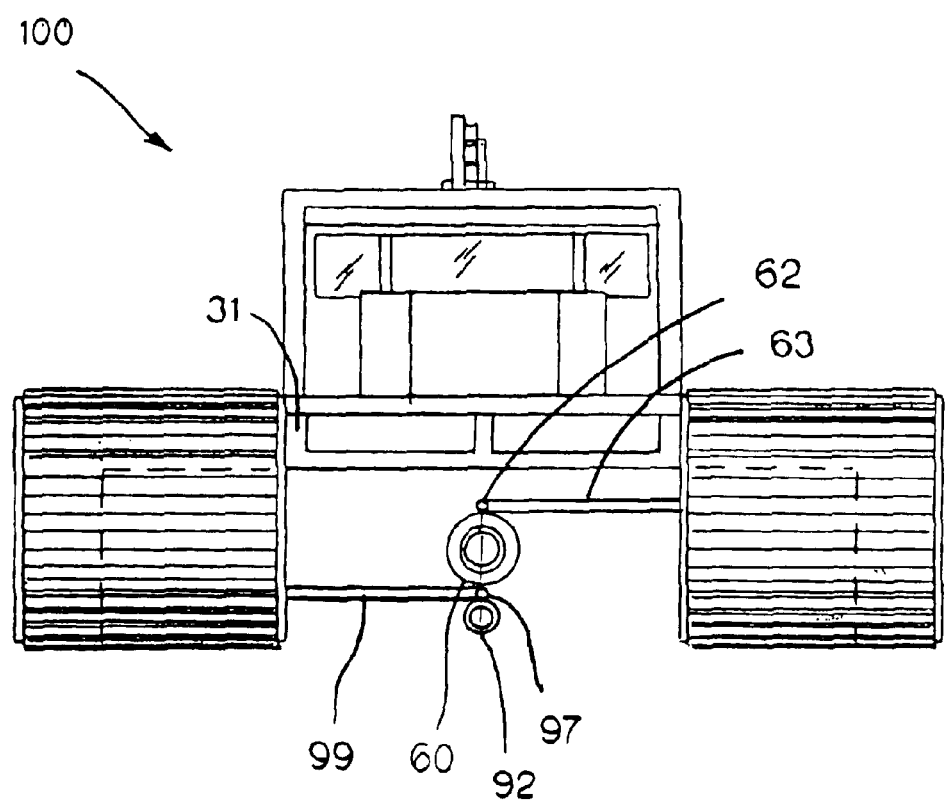
FIG. 3 is a partial rear view of an amphibious dredging vehicle according to the invention.

The rear end portion of the deck 30 is disposed opposite the front end portion of the deck 30. Mounted near the rear end portion of the deck 30 is directable discharge 60, which is more easily seen in FIG. 3. Directable discharge 60 is made from conventional sturdy, flexible tubing such as reinforced rubber or flexible PVC pipe and is joined to discharge plumbing 70 by flange 72 or by another conventional joint. Directable discharge 60 is operatively connected to cutterhead 40 and dredge pump 50 by conventional discharge plumbing 70, which preferably is aluminum pipe with a diameter between 4 inches and 10 inches. Directable discharge 60 is made from flexible material that allows the directable discharge 60 to be aimed as needed to provide the desired propulsion to the amphibious dredging vehicle 100. The directable-discharge-control means takes the form of ring 62 secured to directable discharge 60 and operatively connected to hydraulic ram 63, which is in turn attached to second floatable pontoon 20. The hydraulic ram 63 may be controlled to select and maintain the desired aim of the directable discharge 60. The directable-discharge-control means also may take the form of any of several known devices capable of aiming directable discharge 60—for example, hydraulic cylinders, cables, links, electric motors, solenoids, and other devices operatively connected to directable discharge 60 and capable of changing and maintaining the aim of the directable discharge 60 in the desired orientation.

In the third path, the hydraulic circuit 137 provides power to a water-pump-driving means in the form of a hydraulic drive motor 91 that drives water pump 90. Water pump 90 may be used to pump water from water intake 94 through water discharge 92 to move the amphibious dredging vehicle 100. By controlling the aim or orientation of water discharge 92, the operator may control the direction of the amphibious dredging 100 vehicle when the water pump 90 is being used to move the amphibious dredging vehicle 100 through water. The claimed water-pump-driving means does not have to be a hydraulic drive motor. Instead, the claimed water-pump-driving means may take the form of any device capable of providing sufficient motive power, including electric motors and mechanical transmissions driven either by a central powerplant or a powerplant dedicated to driving the water pump 90.

The rear end portion of the deck 30 is disposed opposite the front end portion of the deck 30. Mounted near the rear end portion of the deck 30 is water discharge 92, which is more easily seen in FIG. 3. Water discharge 92 is operatively connected to water intake 94 and water pump 90 by conventional water-discharge plumbing 96, which preferably is aluminum pipe with a diameter between 4 inches and 10 inches. Water discharge 92 may be made from conventional sturdy, flexible tubing such as reinforced rubber or flexible PVC pipe and is joined to water-discharge plumbing 96 by flange 98 or by another conventional joint. Water discharge 92 is made from flexible tubular material that allows the water discharge 92 to be aimed as needed to provide the desired propulsion to the amphibious dredging vehicle 100. The water-discharge-control means is operatively connected to water discharge 92. The water-discharge-control means may take the form of ring 97 secured to water discharge 92 and operatively connected to hydraulic ram 99, which is operatively connected to ring 97 and attached to second floatable pontoon 20. Ring 97 and hydraulic ram 99 operate in the same manner as ring 62 and hydraulic ram 63 described above. Likewise the water-discharge-control means may take the same forms as the directable-discharge-control means described above. Note that in FIG. 1 water pump 90, water discharge 92, and water intake 94 are shown, but associated hardware such as ring 97, flange 98, and hydraulic ram 99 are omitted from FIG. 1 for clarity; these items appear in FIG. 2 and FIG. 3.

Figure 1:
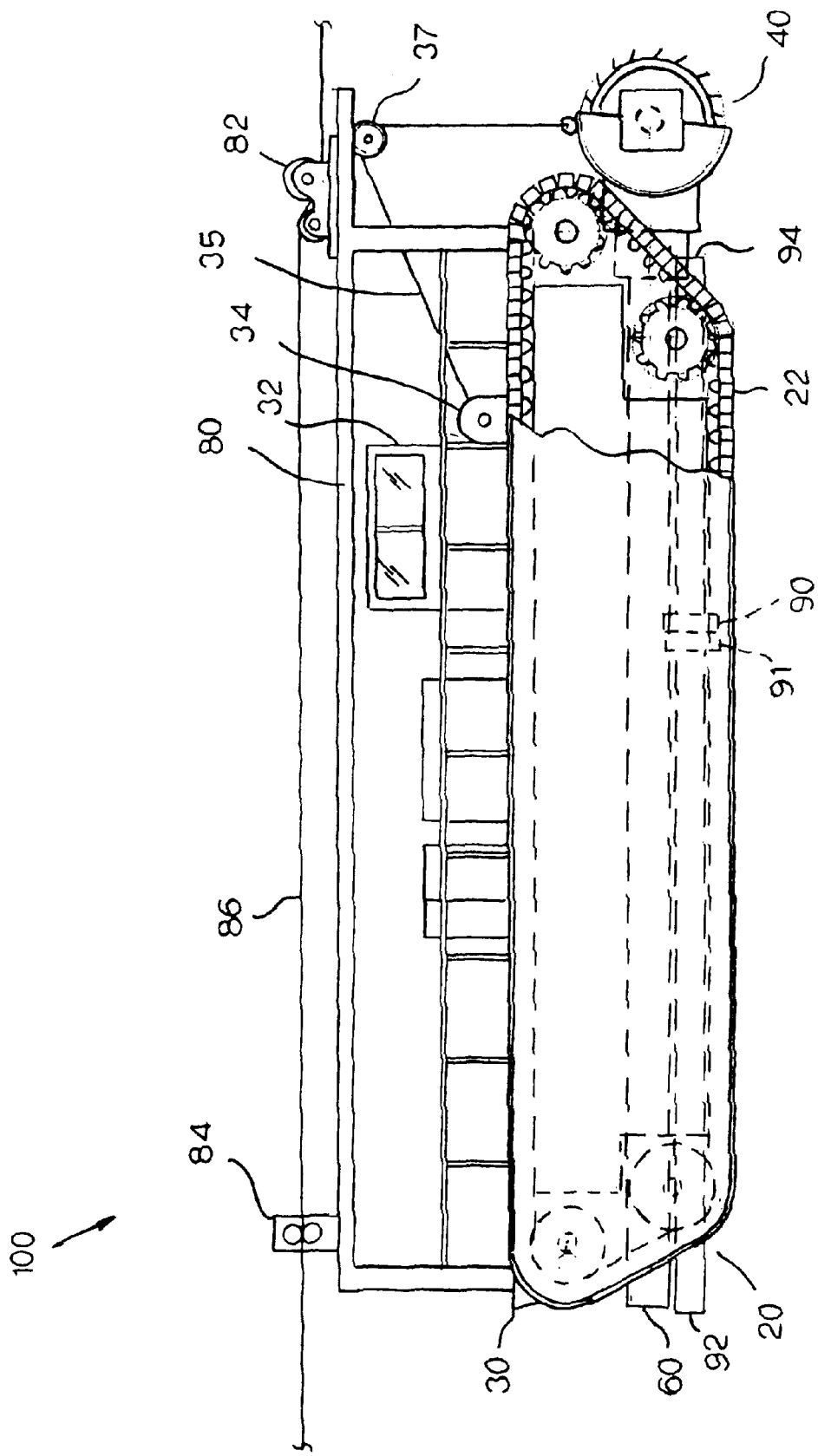
FIG. 1 is a partial side view of an amphibious dredging vehicle according to the invention.

FIG. 1 shows several optional components not previously discussed. Winch 34 is attached to deck 30. Cable 35 is wound onto winch 34. Cable 35 then passes through dredge pulley 37 and is attached to cutterhead 40. Winch 34 thus can raise and lower cutterhead 40 as desired. Overhead frame 80 provides a mounting point for dredge pulley 37. Overhead frame 80 also provides guide-wire pulleys 82 and 84, which attached to guide wire 86. Guide wires sometimes are used in dredging to provide a reference grid for dredging operations. Dredge pulley 37, overhead frame 80, guide-wire pulleys 82 and 84, and guide wire 86 are omitted from the other figures for clarity.

The amphibious dredging vehicle can be used for building up land in a water-covered area in combination with the system and method that the applicant described in his application Ser. No. 10/349,599, filed Jan. 23, 2003, of which this application is a continuation-in-part.

I claim:

1. An amphibious dredging vehicle, comprising:
    (A) a floatable base having front and rear end portions and comprising:
        (i) a first floatable pontoon having a first drive track mounted thereon;
        (ii) a second floatable pontoon having a second drive track mounted thereon;
        (iii) a link disposed between the first floatable pontoon and the second floatable pontoon and holding the first pontoon and the second pontoon in essentially parallel relation;
    (B) a cutterhead dredge system attached to the base, the cutterhead dredge system comprising:
        (i) a cutterhead mounted to the front end portion of the base;
        (ii) a first directable discharge mounted to the rear end portion of the base;
        (iii) a dredge pump in operative connection with the cutterhead and the first directable discharge so as to develop suction at the cutterhead and to propel material from the cutterhead to the first directable discharge;
    (C) a first track-driving means disposed to transmit power to the first drive track;
    (D) a second track-driving means disposed to transmit power to the second drive track;
    (E) a dredge-pump-driving means disposed to transmit power to the dredge pump;

(F) a first directable-discharge-control means for aiming the first directable discharge.

2. An amphibious dredging vehicle according to claim 1, further comprising:
a first powerplant attached to the base; and
a hydraulic circuit 137 powered by the first powerplant.

3. An amphibious dredging vehicle according to claim 2, wherein the dredge-pump-driving means is a hydraulically driven motor powered by the hydraulic circuit.

4. An amphibious dredging vehicle according to claim 3, wherein the first track-driving means is a hydraulically driven motor powered by the hydraulic circuit and the second track-driving means is a hydraulically driven motor powered by the hydraulic circuit.

5. An amphibious dredging vehicle according to claim 3, wherein the first track-driving means is a mechanical transmission powered by the first powerplant and the second track-driving means is a mechanical transmission powered by the first powerplant.

6. An amphibious dredging vehicle according to claim 3, further comprising a second powerplant attached to the base and wherein the first track-driving means is a mechanical transmission powered by the second powerplant and the second track-driving means is a mechanical transmission powered by the second powerplant.

7. An amphibious dredging vehicle according to claim 6, further comprising:
(I) an auxiliary propulsion system attached to the base and comprising:
(i) a water intake;
(ii) a water discharge;
(iii) a pump in operative connection with the water intake and the water discharge so as to develop suction at the water intake and to propel the water to the water discharge;
(iv) a water-discharge-control means for aiming the water discharge;
(v) a water-pump-driving means disposed to transmit power to the water pump.
wherein the water-pump-driving means is a mechanical transmission powered by the second powerplant.

8. An amphibious dredging vehicle according to claim 3, further comprising a second powerplant attached to the base and a third powerplant attached to the base and wherein the first track-driving means is a mechanical transmission powered by the second powerplant and the second track-driving means is a mechanical transmission powered by the third powerplant.

9. An amphibious dredging vehicle according to claim 8, further comprising:
(I) an auxiliary propulsion system attached to the base and comprising:
(i) a water intake;
(ii) a water discharge;
(iii) a pump in operative connection with the water intake and the water discharge so as to develop suction at the water intake and to propel the water to the water discharge;
(iv) a water-discharge-control means for aiming the water discharge;
(v) a water-pump-driving means disposed to transmit power to the water pump.
wherein the water-pump-driving means is a mechanical transmission powered by the third powerplant.

10. An amphibious dredging vehicle according to claim 3, further comprising:
(I) an auxiliary propulsion system attached to the base and comprising:
(i) a water intake;
(ii) a water discharge;
(iii) a pump in operative connection with the water intake and the water discharge so as to develop suction at the water intake and to propel the water to the water discharge;
(iv) a water-discharge-control means for aiming the water discharge;
(v) a water-pump-driving means disposed to transmit power to the water pump.
wherein the water-pump-driving means is a hydraulically driven motor powered by the hydraulic circuit.

11. An amphibious dredging vehicle according to claim 2, wherein the first track-driving means is a hydraulically driven motor powered by the hydraulic circuit and the second track-driving means is a hydraulically driven motor powered by the hydraulic circuit.

12. An amphibious dredging vehicle according to claim 11, wherein the dredge-pump-driving means is a mechanical transmission powered by the first powerplant.

13. An amphibious dredging vehicle according to claim 2, wherein the first track-driving means is a mechanical transmission powered by the first powerplant and the second track-driving means is a mechanical transmission powered by the first powerplant.

14. An amphibious dredging vehicle according to claim 13, wherein the dredge-pump-driving means is a mechanical transmission powered by the first powerplant.

15. An amphibious dredging vehicle according to claim 2, further comprising a second powerplant attached to the base and wherein the first track-driving means is a mechanical transmission powered by the second powerplant and the second track-driving means is a mechanical transmission powered by the second powerplant.

16. An amphibious dredging vehicle according to claim 15, wherein the dredge-pump-driving means is a mechanical transmission powered by the first powerplant.

17. An amphibious dredging vehicle according to claim 2, further comprising a second powerplant attached to the base and a third powerplant attached to the base and wherein the first track-driving means is a mechanical transmission powered by the second powerplant and the second track-driving means is a mechanical transmission powered by the third powerplant.

18. An amphibious dredging vehicle according to claim 17, wherein the dredge-pump-driving means is a mechanical transmission powered by the first powerplant.

19. An amphibious dredging vehicle according to claim 2, wherein the dredge-pump-driving means is a mechanical transmission powered by the first powerplant.

20. An amphibious dredging vehicle according to claim 2, further comprising:
(I) an auxiliary propulsion system attached to the base and comprising:
(i) a water intake;
(ii) a water discharge;
(iii) a pump in operative connection with the water intake and the water discharge so as to develop suction at the water intake and to propel the water to the water discharge;
(iv) a water-discharge-control means for aiming the water discharge;
(v) a water-pump-driving means disposed to transmit power to the water pump;
wherein the water-pump-driving means is a mechanical transmission powered by the first powerplant.

21. An amphibious dredging vehicle according to claim 2, further comprising:

(I) an auxiliary propulsion system attached to the base and comprising:
  (i) a water intake;
  (ii) a water discharge;
  (iii) a pump in operative connection with the water intake and the water discharge so as to develop suction at the water intake and to propel the water to the water discharge;
  (iv) a water-discharge-control means for aiming the water discharge;
  (v) a water-pump-driving means disposed to transmit power to the water pump;
wherein the water-pump-driving means is a hydraulically driven motor powered by the hydraulic circuit.

22. An amphibious dredging vehicle according to claim 1, further comprising a second powerplant attached to the base and further comprising:
(I) an auxiliary propulsion system attached to the base and comprising:
  (i) a water intake;
  (ii) a water discharge;
  (iii) a pump in operative connection with the water intake and the water discharge so as to develop suction at the water intake and to propel the water to the water discharge;
  (iv) a water-discharge-control means for aiming the water discharge;
  (v) a water-pump-driving means disposed to transmit power to the water pump.

23. A system for building up land in a water-covered or water-surrounded area, comprising:
(A) a plurality of boom segments connected end-to-end in an essentially closed shape, each boom segment comprising:
  (i) a floatable body having a first end portion, a second end portion, and a lower side portion;
  (ii) a first body-connecting means, being attached to the first end portion of the body, for connecting together adjacent boom segments;
  (iii) a second body-connecting means, being attached to the second end portion of the body, for connecting together adjacent boom segments;
  (iv) a sieve panel having an upper portion, a lower portion, and first and second side portions, the sieve panel being attached along its upper portion to the body with the first and second end portions of the sieve panel being respectively aligned with the first and second end portions of the body and the sieve panel having a first sieve-panel connecting means, disposed upon the first side portion, for connecting together adjacent sieve panels, and a second sieve-panel connecting means, disposed upon the second side portion, for connecting together adjacent sieve panels, the sieve panel having a height greater than or approximately equal to the depth of the water in the water-covered area and the sieve panel being made from water-permeable, fine-meshed material;
wherein the first body-connecting means of each segment is connected to the second body-connecting means of an adjacent segment, and the first sieve-panel connecting means of each sieve panel is connected to the second sieve-panel connecting means of an adjacent sieve panel; and
(B) a sediment source depositing sediment inside the area substantially enclosed by the essentially closed shape formed by the boom segments, wherein the sediment source is an amphibious dredging vehicle, comprising:
  (i) a floatable base having front and rear end portions and comprising:
    (a) a first floatable pontoon having a first drive track mounted thereon;
    (b) a second floatable pontoon having a second drive track mounted thereon;
    (c) a link disposed between the first floatable pontoon and the second floatable pontoon and holding the first pontoon and the second pontoon in essentially parallel relation;
  (ii) a cutterhead dredge system attached to the base, the cutterhead dredge system comprising:
    (a) a cutterhead mounted to the front end portion of the base;
    (b) a first directable discharge mounted to the rear end portion of the base;
    (c) a dredge pump in operative connection with the cutterhead and the first directable discharge so as to develop suction at the cutterhead and to propel material from the cutterhead to the first directable discharge;
  (iii) a first track-driving means disposed to transmit power to the first drive track;
  (iv) a second track-driving means disposed to transmit power to the second drive track;
  (v) a dredge-pump-driving means disposed to transmit power to the dredge pump;
  (vi) a first directable-discharge-control means for aiming the first directable discharge.

24. A system for building up sediment in a water-covered area, comprising:
(A) a plurality of boom segments connected end-to-end in an essentially closed shape, each boom segment comprising:
  (i) a floatable body having a first end portion, a second end portion, and a lower side portion;
  (ii) a first body-connecting means attached to the first end portion of the body;
  (iii) a second body-connecting means attached to the second end portion of the body;
  (iv) a sieve panel having an upper portion, a lower portion, and first and second side portions, the sieve panel being attached along its upper portion to the body with the first and second end portions of the sieve panel being respectively aligned with the first and second end portions of the body and the sieve panel having a first sieve-panel connecting means disposed upon the first side portion and a second sieve-panel connecting means disposed upon the second side portion, the sieve panel having a height greater than or approximately equal to the depth of the water in the water-covered area and the sieve being made from water-permeable, fine-meshed material;
wherein the first body-connecting means of each segment is connected to the second body-connecting means of an adjacent segment, and the first sieve-panel means for connecting each sieve panel is connected to the second sieve-panel connecting means of an adjacent sieve panel;
(B) a sediment source depositing sediment inside the area substantially enclosed by the essentially closed shape formed by the boom segments, wherein the sediment source is an amphibious dredging vehicle, comprising:
  (i) a floatable base having front and rear end portions and comprising:
    (a) a first floatable pontoon having a first drive track mounted thereon;

(b) a second floatable pontoon having a second drive track mounted thereon;
(c) a link disposed between the first floatable pontoon and the second floatable pontoon and holding the first pontoon and the second pontoon in essentially parallel relation;
(ii) a cutterhead dredge system attached to the base, the cutterhead dredge system comprising:
(a) a cutterhead mounted to the front end portion of the base;
(b) a first directable discharge mounted to the rear end portion of the base;
(c) a dredge pump in operative connection with the cutterhead and the first directable discharge so as to develop suction at the cutterhead and to propel material from the cutterhead to the first directable discharge;
(iii) a first track-driving means disposed to transmit power to the first drive track;
(iv) a second track-driving means disposed to transmit power to the second drive track;
(v) a dredge-pump-driving means disposed to transmit power to the dredge pump;
(vi) a first directable-discharge-control means for aiming the first directable discharge; and
(C) a wasteweir segment disposed so as to close the substantially closed shape formed by the floating boom segments, the wasteweir segment comprising:
(i) an essentially orthogonal frame, the height of the frame being at least about equal to the depth of the water in the water-covered area, the frame having a first side portion, a second side portion, and a base having first and second end portions, the first side portion having a lower end portion attached to the first end portion of the base and a second side portion having a lower end portion attached to the second end portion of the base, the frame having disposed upon the top portion of its first side portion a first wasteweir-body connecting means and having disposed upon the top portion of its second side portion a second wasteweir-body connecting means, the first side portion having disposed thereon a first wasteweir-sieve connecting means, and the second side portion having disposed thereon a second wasteweir-sieve connecting means, and a barrier receiving means; the wasteweir segment being connected by the first wasteweir-body connecting means to the second body-connecting means of a first boom segment and being connected by the second wasteweir-body connecting means to the first body-connecting means of a second boom segment, the wasteweir segment being disposed so that it closes the substantially closed shape formed by the floating boom segments; and
(ii) a barrier element adapted to be engaged by the barrier receiving means of the wasteweir segment.

25. A method for building up land in a water-covered or water-surrounded area, comprising:
(1) erecting a sediment-containment structure comprising
(A) a plurality of boom segments connected end-to-end in an essentially closed shape, each boom segment comprising:
(i) a floatable body having a first end portion, a second end portion, and a lower side portion;
(ii) a first body-connecting means, being attached to the first end portion of the body, for connecting together adjacent boom segments;
(iii) a second body-connecting means, being attached to the second end portion of the body, for connecting together adjacent boom segments;
(iv) a sieve panel having an upper portion, a lower portion, and first and second side portions, the sieve panel being attached along its upper portion to the body with the first and second end portions of the sieve panel being respectively aligned with the first and second end portions of the body and the sieve panel having a first sieve-panel connecting means, disposed upon the first side portion, for connecting together adjacent sieve panels, and a second sieve-panel connecting means, disposed upon the second side portion, for connecting together adjacent sieve panels, the sieve panel having a height greater than or approximately equal to the depth of the water in the water-covered area and the sieve panel being made from water-permeable, fine-meshed material;
wherein the first body-connecting means of each segment is connected to the second body-connecting means of an adjacent segment, and the first sieve-panel connecting means of each sieve panel is connected to the second sieve-panel connecting means of an adjacent sieve panel; and
(B) a sediment source depositing sediment inside the area substantially enclosed by the essentially closed shape formed by the boom segments, wherein the sediment source is an amphibious dredging vehicle, comprising:
(i) a floatable base having front and rear end portions and comprising:
(a) a first floatable pontoon having a first drive track mounted thereon;
(b) a second floatable pontoon having a second drive track mounted thereon;
(c) a link disposed between the first floatable pontoon and the second floatable pontoon and holding the first pontoon and the second pontoon in essentially parallel relation;
(ii) a cutterhead dredge system attached to the base, the cutterhead dredge system comprising:
(a) a cutterhead mounted to the front end portion of the base;
(b) a first directable discharge mounted to the rear end portion of the base;
(c) a dredge pump in operative connection with the cutterhead and the first directable discharge so as to develop suction at the cutterhead and to propel material from the cutterhead to the first directable discharge;
(iii) a first track-driving means disposed to transmit power to the first drive track;
(iv) a second track-driving means disposed to transmit power to the second drive track;
(v) a dredge-pump-driving means disposed to transmit power to the dredge pump;
(vi) a first directable-discharge-control means for aiming the first directable discharge; and
(2) introducing sediment into the substantially closed shape formed by the sediment-containment structure.

26. A method for building up land in a water-covered or water-surrounded area, comprising:
(1) erecting a sediment-containment structure comprising
(A) a plurality of boom segments connected end-to-end in an essentially closed shape, each boom segment comprising:

(i) a floatable body having a first end portion, a second end portion, and a lower side portion;

(ii) a first body-connecting means attached to the first end portion of the body;

(iii) a second body-connecting means attached to the second end portion of the body;

(iv) a sieve panel having an upper portion, a lower portion, and first and second side portions, the sieve panel being attached along its upper portion to the body with the first and second end portions of the sieve panel being respectively aligned with the first and second end portions of the body and the sieve panel having a first sieve-panel connecting means disposed upon the first side portion and a second sieve-panel connecting means disposed upon the second side portion, the sieve panel having a height greater than or approximately equal to the depth of the water in the water-covered area and the sieve being made from water-permeable, fine-meshed material;

wherein the first body-connecting means of each segment is connected to the second body-connecting means of an adjacent segment, and the first sieve-panel means for connecting each sieve panel is connected to the second sieve-panel connecting means of an adjacent sieve panel;

(B) a sediment source depositing sediment inside the area substantially enclosed by the essentially closed shape formed by the boom segments, wherein the sediment source is an amphibious dredging vehicle, comprising:

(i) a floatable base having front and rear end portions and comprising:

(a) a first floatable pontoon having a first drive track mounted thereon;

(b) a second floatable pontoon having a second drive track mounted thereon;

(c) a link disposed between the first floatable pontoon and the second floatable pontoon and holding the first pontoon and the second pontoon in essentially parallel relation;

(ii) a cutterhead dredge system attached to the base, the cutterhead dredge system comprising:

(a) a cutterhead mounted to the front end portion of the base;

(b) a first directable discharge mounted to the rear end portion of the base;

(c) a dredge pump in operative connection with the cutterhead and the first directable discharge so as to develop suction at the cutterhead and to propel material from the cutterhead to the first directable discharge;

(iii) a first track-driving means disposed to transmit power to the first drive track;

(iv) a second track-driving means disposed to transmit power to the second drive track;

(v) a dredge-pump-driving means disposed to transmit power to the dredge pump;

(vi) a first directable-discharge-control means for aiming the first directable discharge; and (C) a wasteweir segment disposed so as to close the substantially closed shape formed by the floating boom segments, the wasteweir segment comprising:

(i) an essentially orthogonal frame, the height of the frame being at least about equal to the depth of the water in the water-covered area, the frame having a first side portion, a second side portion, and a base having first and second end portions, the first side portion having a lower end portion attached to the first end portion of the base and a second side portion having a lower end portion attached to the second end portion of the base, the frame having disposed upon the top portion of its first side portion a first wasteweir-body connecting means and having disposed upon the top portion of its second side portion a second wasteweir-body connecting means, the first side portion having disposed thereon a first wasteweir-sieve connecting means, and the second side portion having disposed thereon a second wasteweir-sieve connecting means, and a barrier receiving means; the wasteweir segment being connected by the first wasteweir-body connecting means to the second body-connecting means of a first boom segment and being connected by the second wasteweir-body connecting means to the first body-connecting means of a second boom segment, the wasteweir segment being disposed so that it closes the substantially closed shape formed by the floating boom segments; and (ii) a barrier element adapted to be engaged by the barrier receiving means of the wasteweir segment; and (2) introducing sediment into the substantially closed shape formed by the sediment-containment structure.

* * * * *